(12) United States Patent
Kim

(10) Patent No.: US 11,130,594 B2
(45) Date of Patent: Sep. 28, 2021

(54) DRONE DOCKING STRUCTURE OF AUTONOMOUS VEHICLE AND A METHOD FOR DELIVERY USING THE SAME

(71) Applicants: Hyundai Motor Company, Seoul (KR); Kia Motors Corporation, Seoul (KR)

(72) Inventor: Jun-Hyuk Kim, Seongnam (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 503 days.

(21) Appl. No.: 15/978,866

(22) Filed: May 14, 2018

(65) Prior Publication Data
US 2019/0168888 A1    Jun. 6, 2019

(30) Foreign Application Priority Data
Dec. 4, 2017    (KR) .................. 10-2017-0165019

(51) Int. Cl.
| | |
|---|---|
| *B64F 1/00* | (2006.01) |
| *B64F 1/12* | (2006.01) |
| *B64C 39/02* | (2006.01) |
| *B60J 7/02* | (2006.01) |
| *B64F 1/32* | (2006.01) |

(52) U.S. Cl.
CPC ............. *B64F 1/12* (2013.01); *B60J 7/022* (2013.01); *B64C 39/024* (2013.01); *B64F 1/007* (2013.01); *B64F 1/32* (2013.01); *B64C 2201/208* (2013.01)

(58) Field of Classification Search
CPC ....... B64F 1/007; B64F 1/12; B64C 2201/208
See application file for complete search history.

(56) References Cited

U.S. PATENT DOCUMENTS

| | | | |
|---|---|---|---|
| 2001/0013714 A1* | 8/2001 | Ochiai | B60J 7/0573 |
| | | | 296/223 |
| 2003/0141834 A1* | 7/2003 | Sakai | E05F 15/619 |
| | | | 318/280 |
| 2009/0039682 A1* | 2/2009 | Ito | B60J 7/192 |
| | | | 296/216.02 |
| 2016/0107531 A1 | 4/2016 | Ge et al. | |
| 2016/0185466 A1 | 6/2016 | Dreano, Jr. | |
| 2016/0244187 A1* | 8/2016 | Byers | A47G 29/14 |
| 2017/0139420 A1 | 5/2017 | Lockwood et al. | |
| 2018/0009549 A1* | 1/2018 | Sullivan | B64F 1/22 |
| 2018/0044015 A1* | 2/2018 | Kim | B64D 27/24 |
| 2018/0056794 A1* | 3/2018 | Kim | B60L 11/182 |
| 2019/0009756 A1* | 1/2019 | Jacobs | B60L 58/13 |

FOREIGN PATENT DOCUMENTS

| | | |
|---|---|---|
| KR | 10-2016-0133806 A | 11/2016 |
| KR | 10-2017-0023423 A | 3/2017 |
| WO | 2016/094067 A1 | 6/2016 |

* cited by examiner

*Primary Examiner* — Jessica B Wong
(74) *Attorney, Agent, or Firm* — Mintz Levin Cohn Ferris Glovsky and Popeo, P.C.; Peter F. Corless

(57) ABSTRACT

A drone docking structure of an autonomous vehicle can include: a coil housing having a space for docking a drone to the vehicle; a docking cover configured to open or close a top portion of the coil housing according to whether the drone is docked; and a motor housing installed on a side surface of the coil housing and including a motor configured to actuate the docking cover.

9 Claims, 6 Drawing Sheets

DRONE DOCKING STRUCTURE OF AUTONOMOUS VEHICLE AND A METHOD FOR DELIVERY USING THE SAME

CROSS-REFERENCE TO RELATED APPLICATIONS

This application claims the benefit of priority under 35 U.S.C. § 119 to Korean Patent Application No. 10-2017-0165019, filed on Dec. 4, 2017 with the Korean Intellectual Property Office, the disclosure of which is incorporated herein by reference in its entirety.

BACKGROUND

1. Technical Field

The present disclosure relates to a drone docking structure of an autonomous vehicle and a method for delivery using the same, and more particularly, to a drone docking structure which operates in a sunroof of a vehicle when a drone is docked and a method for delivery using the same.

2. Description of the Related Art

It is generally known that a drone is an unmanned aerial vehicle without a pilot. The drone was previously developed and used in the military for reconnoitering and destroying an enemy in an international dispute area. Recently, however, the range of applications has expanded due to the convenience of transport and storage and ease of operation which drones provide. For example, since drones are relatively lightweight and easy to operate, they are widely used for broadcasting, observing wildlife, and monitoring poaching in wide areas, to name a few. Drones are even used for dangerous tasks such as reconnoitering situations in hazardous and/or disaster areas.

However, when conventional drone technology is applied to a vehicle, new equipment must be added, and as a result, costs increase. Further, there is a problem in that the conventional drone technology cannot dock with a sunroof of the vehicle.

SUMMARY

The present disclosure has been made in an effort to provide a drone docking structure of an autonomous vehicle, which docks a drone to a vehicle to safely deliver an article by means of the drone.

The present disclosure has also been made in an effort to provide a delivery method for delivering the article through the drone docking structure.

According to embodiments of the present disclosure, a drone docking structure of an autonomous vehicle can include: drone docking structure of a vehicle, the drone docking structure comprising: a coil housing having a space for docking a drone to the vehicle; a docking cover configured to open or close a top portion of the coil housing according to whether the drone is docked; and a motor housing installed on a side surface of the coil housing and including a motor configured to actuate the docking cover.

The coil housing may include a coil arranged on an inner wall of the coil housing in a spiral shape so as to generate a magnetic field when power is applied to the coil, the power being applied when the drone is docked to the vehicle, and a mounting core magnetized in the form of an electromagnet due to the magnetic field of the coil, the mounting core having a predetermined length from a center of a bottom portion of the coil housing.

The mounting core may have a space therein so as to fix the legs of the drone when the mounting core is magnetized due to the magnetic field of the coil.

The docking cover may further include a sealing rubber, a lower portion of which contacting an upper periphery of the coil housing so as to seal the coil housing when the top portion of the coil housing is closed.

The docking cover may further include a rack gear connected to the motor, the rack gear configured to move the docking cover left or right in a longitudinal direction when power is applied to the motor or a coil in the coil housing.

The rack gear may be further configured to transfer a rotational force of the motor to a center of a lower surface of the docking cover in a linear form in the longitudinal direction.

The drone docking structure may further include a sunroof controller controlling an operation of the docking cover based on a signal indicating whether the drone is docked received from a telematics controller controlling an operation of the vehicle.

The sunroof controller may control power applied to the motor or a coil in the coil housing.

The telematics controller may transfer control of an operation relating to landing or dismount of the drone to the sunroof controller.

The telematics controller can control a driving operation of the vehicle.

The drone docking structure can dock the drone to the vehicle by fixing legs of the drone to a plurality of corners of a sunroof of the vehicle.

Furthermore, according to embodiments of the present disclosure, a method for delivery using a drone docking structure of an autonomous vehicle can include: transmitting, by a telematics controller controlling an operation of the vehicle, a landing signal to a sunroof controller of the vehicle for docking a drone to the vehicle; docking, by the sunroof controller, the drone to the vehicle, the docking of the drone to the vehicle comprising: receiving the landing signal from the telematics controller, applying power to a coil in a coil housing for opening a sunroof of the vehicle, and docking the drone to a plurality of corners of the sunroof; and dismounting the drone from the vehicle by closing the sunroof and releasing the power in response to receiving a dismount signal from the telematics controller, wherein a docking cover is configured to open or close a top portion of the coil housing.

The docking of the drone to the vehicle may further include applying, by the sunroof controller, the power to a motor configured to actuate the docking cover.

The coil may be arranged on an inner wall of the coil housing in a spiral shape.

The method may further include magnetizing a mounting core in the form of an electromagnet due to a magnetic field of the coil, the mounting core having a predetermined length from a center of a bottom portion of the coil housing; and fixing legs of the drone in the magnetized mounting core.

The drone may be dismounted from the vehicle after the drone performs a delivery operation.

According to the present disclosure, in an autonomous vehicle, parcels can be rapidly and safely received. A magnetic field is generated when necessary by utilizing an electromagnet using an electromagnetic induction effect, which offers more robust protection against contamination compared with a permanent magnet.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

Figure 1:
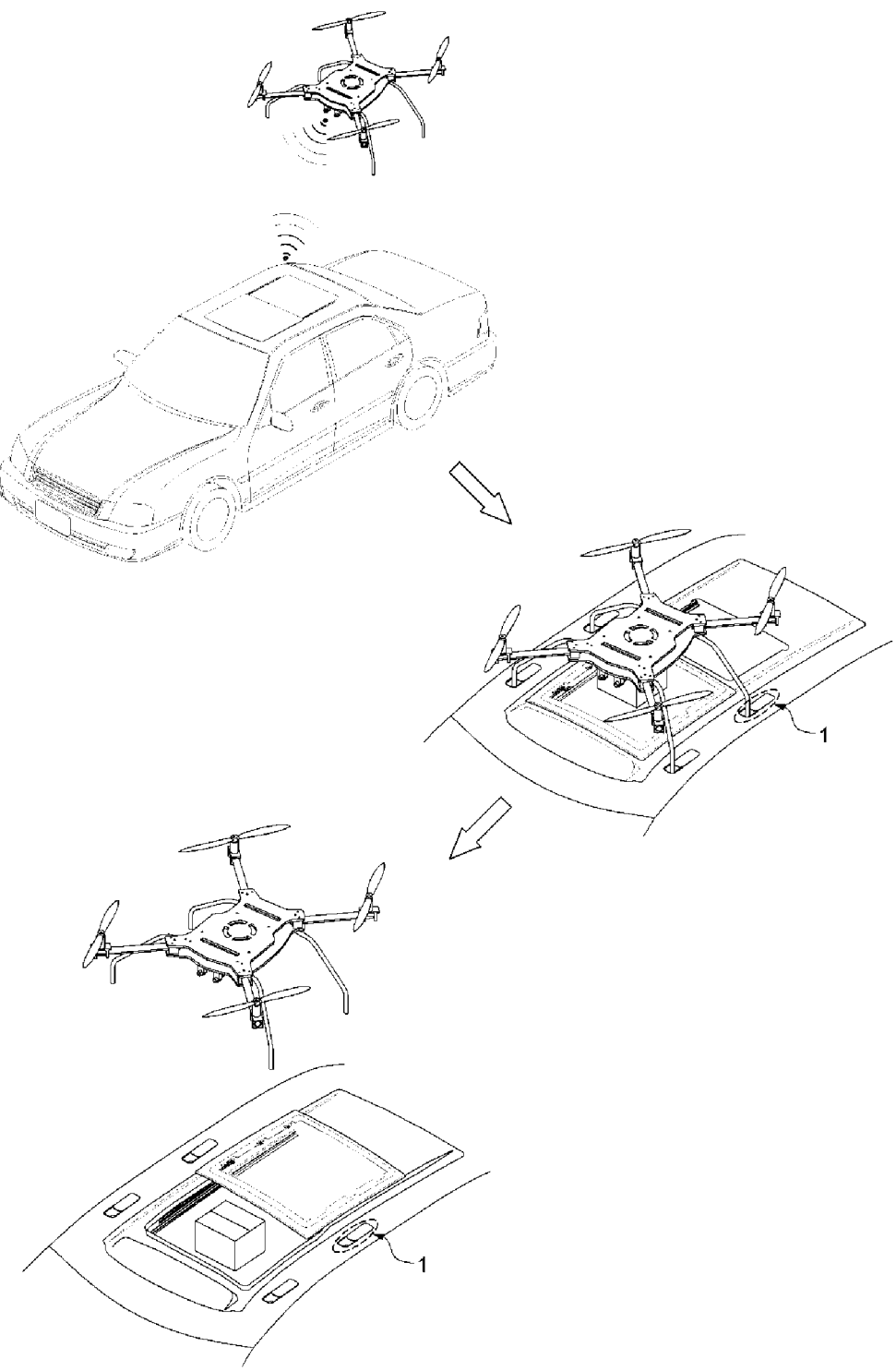
FIG. 1 illustrates a method for delivery using a drone docking structure of an autonomous vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, the present disclosure will be described in detail with reference to contents disclosed in the accompanying drawings. However, the present disclosure is not restricted or limited by exemplary embodiments. Like reference numerals presented in each drawing refer to elements that perform substantially the same functions.

Objects and effects of the present disclosure may be appreciated or become clearer by the following description and the objects and effects of the present disclosure are not limited only by the following disclosure. Further, in describing the present disclosure, a detailed explanation of known technologies associated with the present disclosure may be omitted to avoid unnecessarily obscuring the subject matter of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, the present disclosure relates to a drone docking structure of an autonomous vehicle and a method for delivery using the same and the method for delivery is first described and the drone docking structure applied thereto is described.

FIG. 1 illustrates a method for delivery using a drone docking structure 1 of an autonomous vehicle according to embodiments the present disclosure. As shown in FIG. 1, a process in which a drone is docked to the autonomous vehicle to deliver an article may be seen.

The method for delivery using the drone docking structure 1 may include, for example, transmitting, by a telematics controller controlling a vehicle, a landing signal to a sunroof controller of the vehicle for docking a drone to the vehicle; docking, by the sunroof controller, the drone by receiving the landing signal and applying power to a coil housing 10 for opening a sunroof and docking the drone to both corners of the sunroof and a docking cover 20 for opening or closing a top portion of the coil housing 10; and dismounting the drone by closing the sunroof and releasing the power according to dismount signal of the telematics controller after delivery by the drone.

The transmitting of the landing signal to the sunroof controller of the vehicle is a process in which when the drone approaches the vehicle, the telematics controller of the vehicle starts communication with a delivery service, and as a result, the telematics controller communicates with the sunroof controller of the corresponding vehicle by verifying a vehicle that will be delivered with the article. The sunroof controller that receives the landing signal applies the power to a motor 301 attached to the docking cover 20 and applies current to a coil 101.

Figure 2:
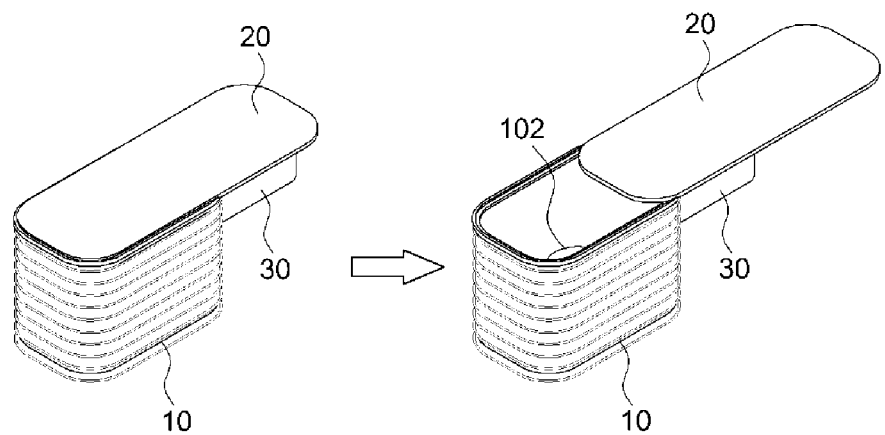
FIG. 2 illustrates a movement of a docking cover according to embodiments of the present disclosure.

FIG. 2 illustrates a movement of a docking cover 20 according to embodiments of the present disclosure. As shown in FIG. 2, the docking cover 20 is configured to be disposed on an upper surface of the coil housing 10 and move left and right. The docking cover 20 moves left and right so that legs of the drone move into and out of the coil housing 10 and is closed at a normal time when the drone is not docked to prevent external foreign materials, or the like from being penetrated.

In FIG. 1, the coil housing 10 is provided at a position where the legs of the drone are seated and two coil housings 10 are positioned at both corners of the sunroof in accordance with embodiments of the present disclosure. However, the present disclosure is not limited thereto, and it can be manufactured by deforming according to a shape, a leg model, or the number of legs of the drone.

The docking of the drone may further include applying, by the sunroof controller, the power to the motor 301 that actuates the docking cover 20 and applying, by the sunroof controller, the power to the coils 101 arranged on an inner wall of the coil housing 10 in a spiral shape.

Figure 3:
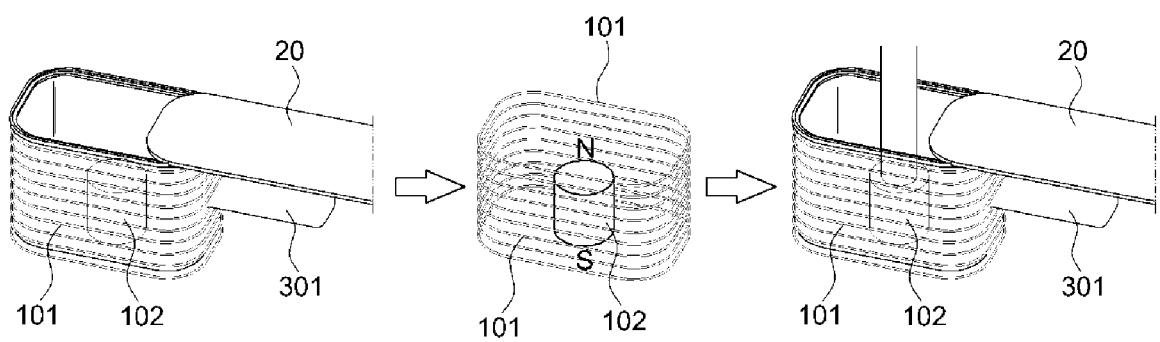
FIG. 3 illustrates a drone being docked according to embodiments of the present disclosure.

FIG. 3 illustrates a drone being docked according to embodiments of the present disclosure. As shown in FIG. 3, when the sunroof controller applies the power to the motor 301 and the coil 101, the docking cover 20 is opened and current flows on the coil 101, and as a result, a magnetic field may be formed around a mounting core 102 at the center.

The docking of the drone may include magnetizing the mounting core 102 at the center of the bottom surface of the coil housing 10 in the form of an electromagnet according to the magnetic field of the coil 101 and fixing the legs of the drones in the mounting core 102 when the drone is docked.

The docking cover 20 is opened by a rack gear 202 when the power is applied to the motor 301 in the sunroof controller. The rack gear 202 will be described below in disclosure of an apparatus. When the magnetic field is formed around the mounting core 102, the mounting core 102 serves as the electromagnet and the drone leg made of iron may be fixed to the mounting core 102.

When the power is applied to the motor 301 attached to the docking cover 20 in the sunroof controller, the docking cover 20 is opened and a space is provided in which the legs of the drone may be fixed. Further, when the power is applied to the coil 101, the magnetic field is formed around the core and the core serves as the electromagnet to fix the leg of the drone.

The dismounting of the drone is a process after the delivery of the article is completed. When the delivery of the article is completed, the drone may transmit a signal to each controller or a driver may personally transmit that the delivery is completed to the telematics controller. Since the present disclosure indicates the movement of each apparatus after receiving a signal indicating that the delivery of the article is completed, the completion of delivering the article is not limited to the above-described method and various methods may be applied. After the delivery of the article is completed, the sunroof controller may stop the power supply to the motor 301 and the coil 101 for dismounting the drone.

The drone docking structure 1 of the autonomous vehicle applied to the disclosure of the method will be described below.

Figure 4:
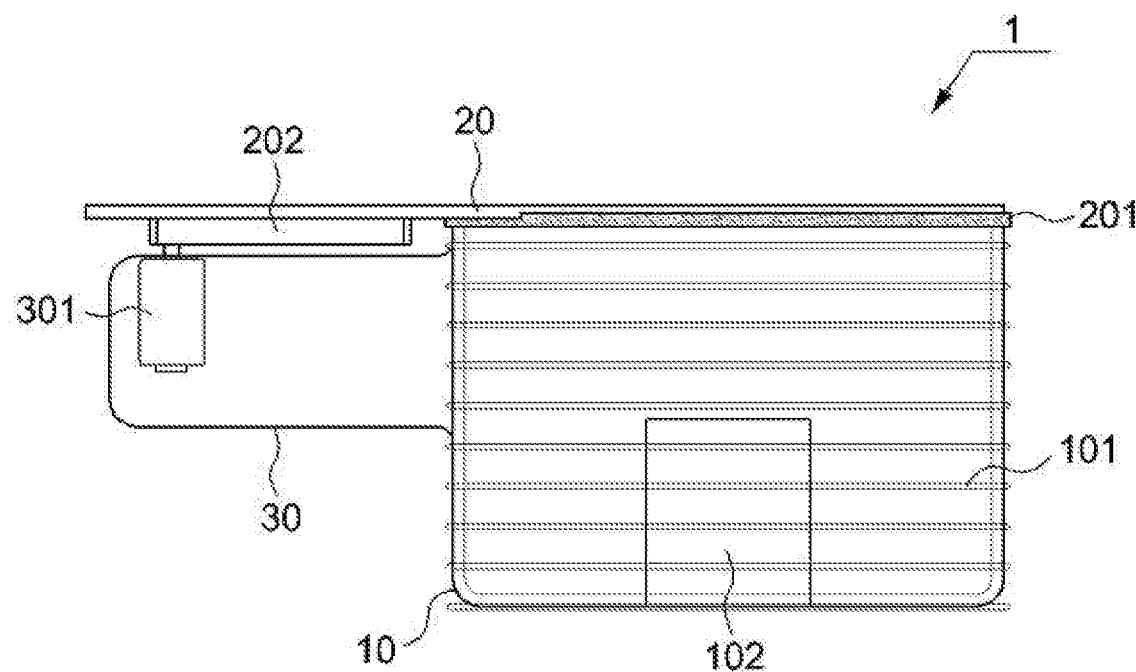
FIG. 4 illustrates a drone docking structure of an autonomous vehicle according to embodiments of the present disclosure.

FIG. 4 illustrates a drone docking structure 1 of an autonomous vehicle according to embodiments of the present disclosure. As shown in FIG. 4, the drone docking structure 1 may include the coil housing 10, the docking cover 20, and the motor housing 30. Although not illustrated, the drone docking structure 1 may include the sunroof controller that provides the power to the coil 101 and the motor 301 installed in the coil housing 10 and the motor housing 30, respectively.

The sunroof controller may receive whether the drone is docked from the telematics controller that controls a driving operation of the vehicle (e.g., steering the vehicle, controlling a speed of the vehicle, etc.) and control an operation of the docking cover 20 and control the power applied to the motor 301 or the coil 101. The telematics controller may transfer dismounting or landing of the drone to the sunroof controller.

The coil housing 10 has a space for docking the drone in the vehicle by fixing the legs of the drone to both corners of the sunroof. In the coil housing 10, two coil housings 10 are positioned on both corners of the sunroof according to the exemplary embodiment of the present disclosure, respectively, but the present disclosure is not limited thereto and may be modified and manufactured according to the shape, the leg model, or the number of legs of the drone.

Figure 5:
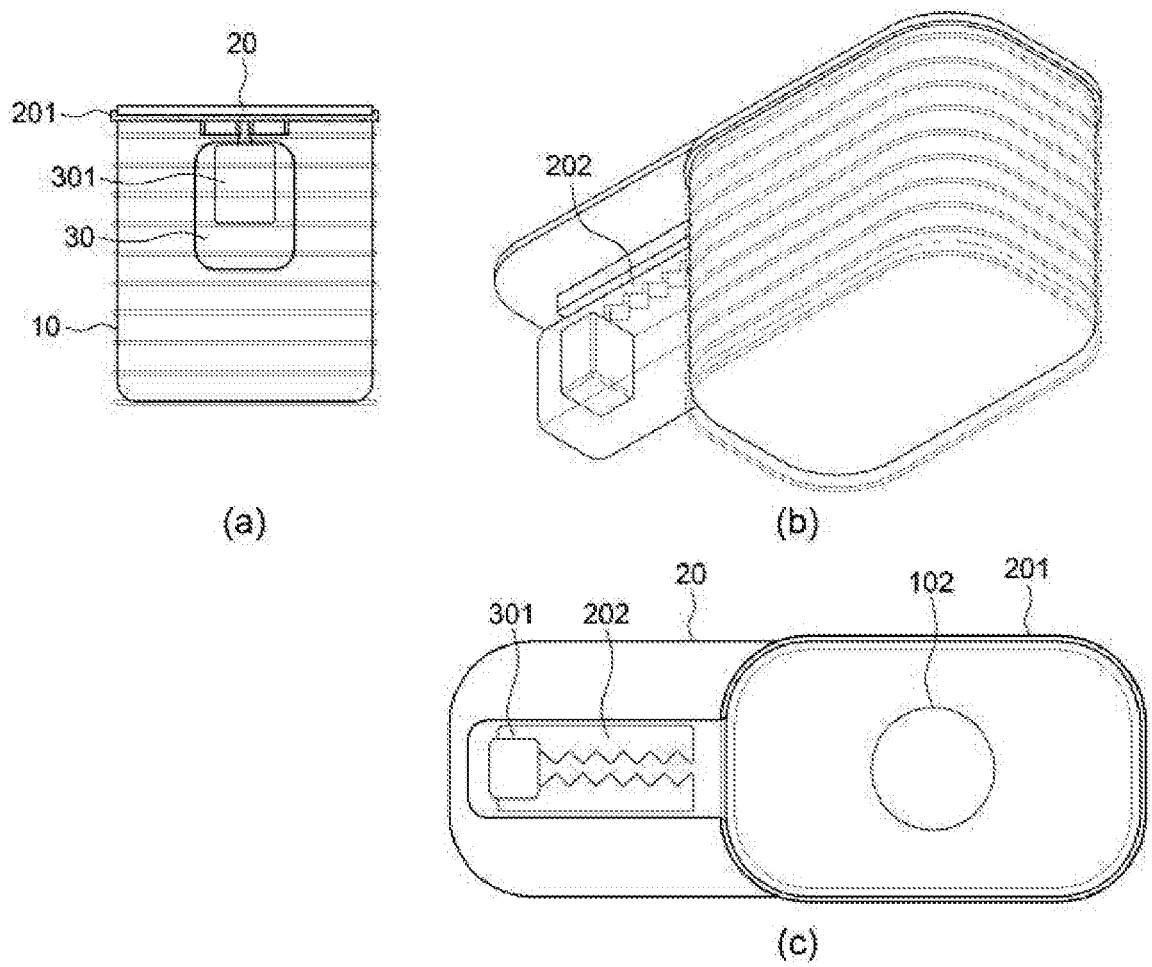
FIG. 5 is a view illustrating the drone docking structure of an autonomous vehicle according to embodiments of the present disclosure viewed from various angles.

FIG. 5 is a view illustrating the drone docking structure 1 of an autonomous vehicle according to embodiments of the present disclosure viewed from various angles. FIG. 5(a) illustrates a side view, FIG. 5(b) illustrates a bottom view, and FIG. 5(a) illustrates a plan view.

Referring first to FIG. 5(a), it can be seen that the motor 301 and the rack gear 202 are positioned at the center of the docking cover 20. Referring next to FIG. 5(b), a process can be seen, in which the docking cover 20 moves linearly according to the shape of the rack gear 202 when the motor 301 is driven. Referring next to FIG. 5(c), the mounting core 102 is positioned at the center of the coil housing 10, and when the power is applied to the motor 301 and the coil 101, the opening of the docking cover 20 and a location where the drone is docked to the mounting core 102 may be known.

The coil housing 10 may include the coils 101 arranged in the spiral shape on the inner wall so as to form the magnetic field according to the applied power when the drone is docked and the mounting core 102 magnetized in the form of the electromagnet according to the magnetic field of the coil 101 with a predetermined length from the center of the bottom portion of the coil housing 10.

The coils 101 arranged in the spiral shape on the inner wall may be arranged from the top to the bottom or from the bottom to the top and when the mounting core 102 is magnetized due to the magnetic field of the coil 101, the mounting core 102 has a space therein so as to fix the legs of the drone.

When the legs of the drone are coupled to the space, the legs made of iron may be fixed in close contact with the electromagnet and when the space is formed in the same shape as the leg of the drone, the article may be stably delivered to the vehicle even though the vehicle is shaken.

Figure 6:
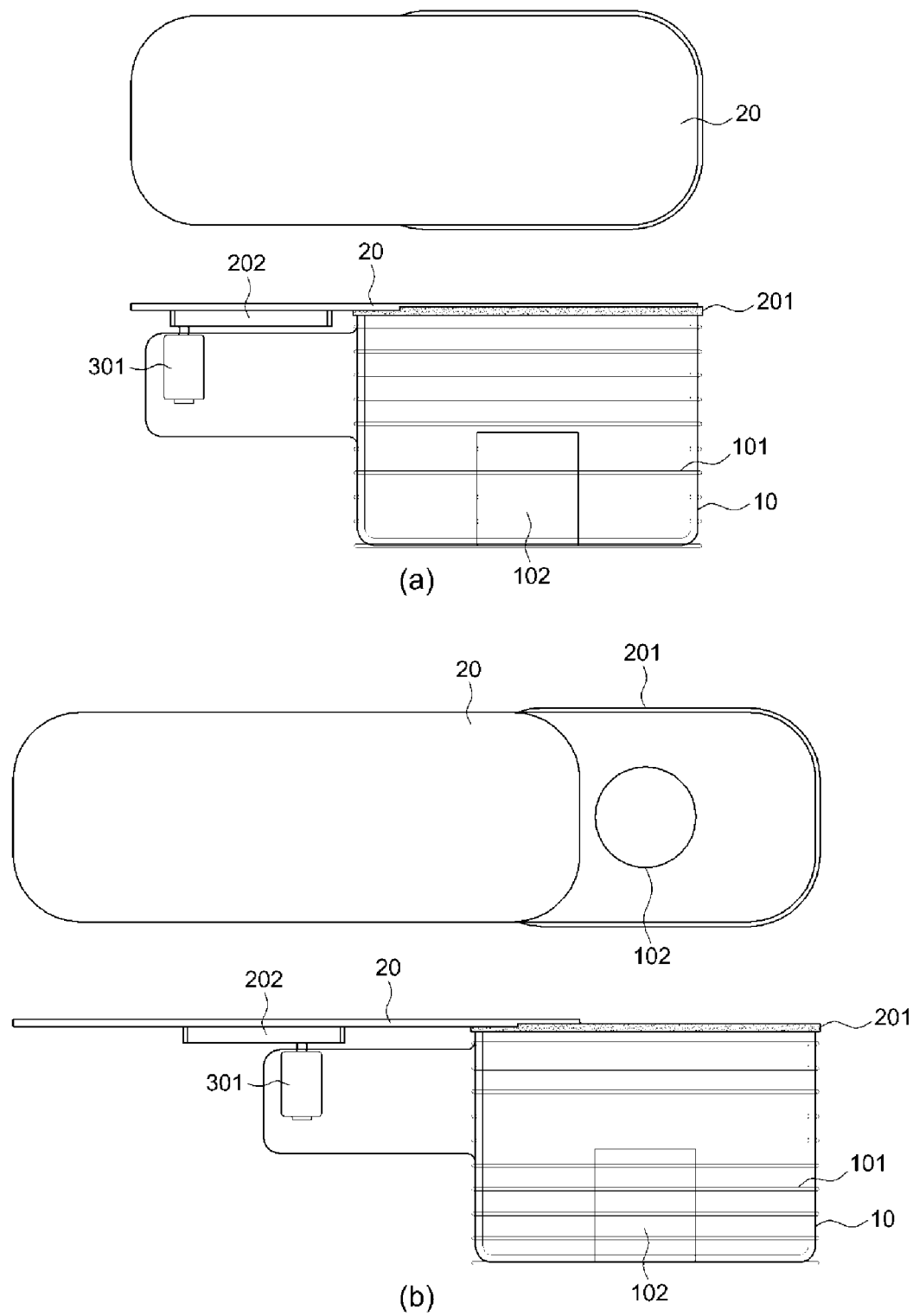
FIG. 6 illustrates a movement of the drone docking structure of an autonomous vehicle according to embodiments of the present disclosure.

FIG. 6 illustrates a movement of the drone docking structure 1 of an autonomous vehicle according to embodiments of the present disclosure. As shown in FIG. 6, the docking cover 20 serves to open or close the upper surface of the coil housing 10 depending on whether the drone is docked.

The docking cover 20 includes sealing rubber 201 on a lower surface thereof, which contacts an upper periphery of the coil housing 10 so as to seal the coil housing 10 when the upper surface of the coil housing 10 is closed. The sealing rubber 201 may be made of all materials that may be sealed and is not limited to a particular material.

The docking cover 20 may include the rack gear 202 connected to the motor 301 and configured to actuate the docking cover 20 so as to move the docking cover 20 left and right in a longitudinal direction when the power is applied. The rack gear 202 may be formed to transfer rotational force of the motor 301 to the docking cover 20 in a linear form in connection with the center of the lower surface of the docking cover 20 in the longitudinal direction of the docking cover 20 with a predetermined width.

The motor housing 30 has the motor 301 installed on a side surface of the coil housing 10. The motor 301 can be configured to actuate the docking cover 20 so as to open or close the docking cover 20. The motor housing 30 is installed on both ends of the sunroof as well as the coil housing 10 and installed in a direction in which the docking cover 20 is opened to serve to support opening or closing of the docking cover 20.

Although the present disclosure has been described in detail through the representative exemplary embodiment hereinabove, it will be appreciated that various modifications of the disclosed embodiments of the present disclosure can be made by those skilled in the art within a limit without departing from the scope of the present disclosure. Therefore, the scope of the present disclosure should not be determined to be limited to the disclosed embodiments and should be defined by appended claims to be described below and all modifications or modified forms derived from equivalent concepts to the appended claims.

What is claimed is:

1. A drone docking structure of an autonomous vehicle, the drone docking structure comprising:
   a coil housing having a space for docking a drone to the vehicle;
   a docking cover configured to open or close a top portion of the coil housing according to whether the drone is docked; and
   a motor housing installed on a side surface of the coil housing and including a motor configured to actuate the docking cover,
   wherein the coil housing includes:
      coil arranged on an inner wall of the coil housing in a spiral shape so as to generate a magnetic field when power is applied to the coil, the power being applied when the drone is docked to the vehicle, and
      a mounting core magnetized in the form of an electromagnet due to the magnetic field of the coil, the mounting core having a predetermined length from a center of a bottom portion of the coil housing, and
   wherein the mounting core has a space therein so as to fix the legs of the drone when the mounting core is magnetized due to the magnetic field of the coil.

2. The drone docking structure of claim 1, wherein the docking cover includes a sealing rubber, a lower portion of which contacting an upper periphery of the coil housing so as to seal the coil housing when the top portion of the coil housing is closed.

3. The drone docking structure of claim 1, wherein the docking cover includes a rack gear connected to the motor, the rack gear configured to move the docking cover left or right in a longitudinal direction when power is applied to the motor or a coil in the coil housing.

4. The drone docking structure of claim 3, wherein the rack gear is further configured to transfer a rotational force of the motor to a center of a lower surface of the docking cover in a linear form in the longitudinal direction.

5. The drone docking structure of claim 1, further comprising:
   a sunroof controller for opening a sunroof of the vehicle and controlling an operation of the docking cover based on a signal indicating whether the drone is docked received from a telematics controller controlling an operation of the vehicle.

6. The drone docking structure of claim 5, wherein the sunroof controller controls power applied to the motor or a coil in the coil housing.

7. The drone docking structure of claim 5, wherein the telematics controller transfers control of an operation relating to landing or dismount of the drone to the sunroof controller.

8. The drone docking structure of claim 5, wherein the telematics controller controls a driving operation of the vehicle.

9. The drone docking structure of claim 1, wherein the drone docking structure is provided in a plurality of corners of a sunroof of the vehicle to dock the drone to the vehicle.

* * * * *